United States Patent [19]

Bonnema et al.

[11] Patent Number: 4,969,670
[45] Date of Patent: Nov. 13, 1990

[54] LARGE DIAMETER CORRUGATED PLASTIC PIPE

[75] Inventors: Eldon G. Bonnema, Prinsburg, Minn.; James L. Fouss, Baton Rouge, La.

[73] Assignee: Prinsco, Inc., Prinsburg, Minn.

[21] Appl. No.: 512,058

[22] Filed: Apr. 20, 1990

Related U.S. Application Data

[63] Continuation of Ser. No. 07/201,631, Jun. 2, 1988, abandoned.

[51] Int. Cl.$^5$ .......................................... F16L 21/00
[52] U.S. Cl. .................................... 285/319; 285/423; 285/903; 285/921
[58] Field of Search ............... 285/260, 903, 319, 423, 285/92

[56] References Cited

U.S. PATENT DOCUMENTS

| | | |
|---|---|---|
| D. 235,100 | 5/1975 | Maroschak . |
| D. 235,101 | 5/1975 | Maroschak . |
| D. 235,102 | 5/1975 | Maroshcak . |
| D. 235,103 | 5/1975 | Maroschak . |
| D. 235,104 | 5/1975 | Maroschak . |
| 1,049,542 | 1/1913 | Smith . |
| 2,537,284 | 1/1951 | Schuder . |
| 2,650,114 | 8/1953 | Epstein . |
| 3,167,330 | 1/1965 | Draudt . |
| 3,188,586 | 6/1965 | Martin et al. . |
| 3,239,254 | 3/1966 | Cambell . |
| 3,471,179 | 10/1969 | Sixt . |
| 3,669,473 | 6/1972 | Martin et al. . |
| 3,695,643 | 10/1972 | Schmunk . |
| 3,699,684 | 10/1972 | Sixt . |
| 3,747,352 | 7/1973 | Maroschak . |
| 3,789,615 | 2/1974 | Maroschak . |
| 3,792,941 | 2/1974 | Maroschak . |
| 3,792,942 | 2/1974 | Cole . |
| 3,799,418 | 3/1974 | Maroschak . |
| 3,802,202 | 4/1974 | Maroschak . |
| 3,831,470 | 8/1974 | Maroshcak . |
| 3,854,527 | 12/1974 | Maroschak . |
| 3,859,025 | 1/1975 | Maroschak . |
| 3,861,152 | 1/1975 | Maroschak . |
| 3,861,153 | 1/1975 | Maroschak . |
| 3,864,446 | 2/1975 | Maroschak . |
| 3,877,831 | 4/1975 | Maroschak . |
| 3,891,733 | 6/1975 | Maroschak . |
| 3,897,090 | 7/1975 | Maroschak ...................... 285/903 X |
| 3,899,198 | 8/1975 | Maroschak . |
| 3,910,713 | 10/1975 | Maroshcak . |
| 3,916,763 | 11/1975 | Marschak . |
| 3,919,367 | 11/1975 | Maroschak . |
| 3,990,827 | 11/1976 | Maroschak . |
| 4,003,685 | 1/1977 | Maroschak . |
| 4,247,136 | 1/1981 | Fouss et al. . |
| 4,286,808 | 9/1981 | Fouss et al. . |
| 4,439,130 | 3/1984 | Dickhut et al. . |
| 4,441,745 | 4/1984 | Nicholas .......................... 285/903 X |
| 4,480,855 | 11/1984 | Rosenbaum .................... 285/903 X |
| 4,575,133 | 3/1986 | Nattel ................................. 285/319 |
| 4,711,472 | 12/1987 | Schnel ............................. 285/319 X |

FOREIGN PATENT DOCUMENTS

| | | |
|---|---|---|
| 928911 | 6/1963 | Fed. Rep. of Germany . |
| 1247652 | 10/1960 | France . |
| WO87/4767 | 8/1987 | PCT Int'l Appl. ................. 285/903 |
| 352204 | 3/1961 | Switzerland . |

Primary Examiner—Dave W. Arola
Attorney, Agent, or Firm—Schroeder & Siegfried

[57] ABSTRACT

Non-releasable, molded, large-diameter, corrugated plastic pipe having a wall structure made of high density polyethylene, PVC or polypropylene of sufficient thickness so as to be rigid but elastic and therefore relatively inflexible and having an integral automatically locking female coupling at one end and a cooperative male coupling at its opposite end, with access to its latching members at its exterior, and a method of manufacturing multiples thereof by a continuous molding process. The pipe has a corrugated wall structure. Only minor auxiliary cutting operations are required to separate portions thereof into individual plastic pipe sections, each having the automatic-locking coupling at one of its ends and a male portion at its other end. The coupling is supported on the corrugated pipe by a frusto-conically shaped collar which functions as a guide for proper alignment as two sections of such pipe are united into latched relation. Each coupling has a plurality of hinged latching members carrying inwardly extending lugs which are cammed outwardly on their advancing faces to permit reception of the male opposite end of a similarly formed pipe and are formed with a latching mechanism on their retracting faces in a manner designed to provide non-releasable locking action therebetween.

23 Claims, 3 Drawing Sheets

(PRIOR ART)

LARGE DIAMETER CORRUGATED PLASTIC PIPE

This is a continuation of pending U.S. patent application Ser. No. 07/201,631, filed June 2, 1988, now abandoned, and entitled LARGE DIAMETER CORRUGATED PLASTIC PIPE. Applicant claims the benefits of 35 U.S.C. §120 with respect to said U.S. patent application, Ser. No. 07/201,631. This application is also related to U.S. patent application, Ser. No. 07/120,824, filed Nov. 16, 1987, now U.S. Pat. No. 4,913,473, and entitled LARGE DIAMETER DOUBLE-WALLED PLASTIC PIPE.

BACKGROUND OF PRIOR ART

The coupling of individual plastic pipe sections has been troublesome for many years because of the amount of time consumed in making the connection and the attendant excessive expense and labor, as well as the difficulties experienced with some type of couplings because of inaccessibility of the connector elements once the connection had been accomplished, as well as the difficulties experienced with some type of couplings because of their inherent inability to prevent uncoupling as a result of retractive forces exerted upon one or both of the connected pipe sections. Additionally, the introduction in recent years of corrugated pipe in increasingly larger sizes of 8 inches and larger, having different coupling characteristics because of correspondingly greater corrugation pitches, deeper valleys, thicker walls, and greater rigidity and inflexibility required to meet industry standards and performance specifications, has created a need for previously unnecessary and consequently unanticipated types of coupling systems, which are not taught by the prior art. Additionally, the increasing recognition and popularization of the usefulness of this pipe in more demanding and more stringent end use applications such as culverts and storm sewers, in addition to the traditional land drainage applications, has created a need for improved coupling systems of types previously unnecessary and consequently unanticipated and unknown. Outlined hereinbelow are some of the known and currently utilized types of coupling systems which are inherently unsatisfactory for use with such pipe over the current and projected future range of end use applications.

Pipe constructed as in the Maroschak Pat. No. 3,899,198 is not connectable in the larger sizes because the material will not stretch or deflect sufficiently so that the connection can be accomplished by manually forcing one end of the pipe into the connector. In other words, the laborer laying the pipe cannot exert sufficient axial pressure to effect the connection. Additionally, the Maroschak patent describes a design to perform the express function of providing for a releasable connection. This function is totally inappropriate in a coupling system intended for use over a range of end use applications including those in which non-releasable connections are highly desirable and releasable connections are unsatisfactory.

As shown below and in the Maroschak patent above, efforts have been made to design and produce separate plastic couplings in the form of separate sleeves, but these designs have proven unduly cumbersome, expensive, time-consuming and generally inadequate with the smaller pipe sizes and inappropriately designed to function properly with the larger pipe sizes and in the more demanding and more stringent end use applications, such as culverts and storm sewers. One coupling has previously been designed as an integral part of the plastic pipe, as shown in Fouss et al Pat. No. 4,247,136, but it has several disadvantages, one of which is the inaccessability of its latching elements once the two ends of pipe have been secured thereby.

Another disadvantage is that the reduced diameter of this coupling necessarily constricts the inner diameter of the piping system at all coupled connections. This reduces the flow capacity of the system accordingly. This also introduces multiple points at which any carried solids can catch and build up, and at which iron ochre deposits can grow and build up under certain conditions. Both of these conditions can restrict flow and, in extreme cases, create blockages causing the system to fail. Also, since the latching elements are formed in the interior or male segments of the coupling, the fluid being conveyed in the pipe will be contaminated by fluid on the outside walls of the pipe which is retained within and around the latching elements.

BRIEF SUMMARY OF THE INVENTION

Our invention includes the method of continuously manufacturing corrugated plastic pipe, the wall structure being molded of high density polyethylene, PVC, or polypropylene. The pipe is cut into sections so that relatively short and enlarged female connector portions thereof are carried at one end of each section, and nominal diameter pipe for the male connector portions are carried at the opposite end. Each female connector portion is molded with a plurality of inwardly extending hinged latches integrally formed therewith which function to lock a male portion in place when a male portion engages the female portion in interlocking relation. The molding apparatus which we utilize is conventional, similar to that shown in the Dickhut et al Pat. No. 4,439,130, the contents of which is incorporated herein by reference thereto.

As indicated above, the pipe sections are continuously formed and must be cut into individual sections. To accomplish this, the pipe sections are formed with supporting collars between each female and male portion of the pipe. In severing the pipe sections, the collar which is adjacent the hinge of the latches of the adjacent female portion is removed, thereby leaving the exposed female connector portion and male connector portion of which the removed collar had previously joined. The wall structure is then cut around each latch between opposite ends of its respective hinge to enable the latch to be swung upwardly at the hinge to admit entrance of an adjoining male portion.

Out invention also includes the pipe itself, particularly the female connector portion at one end of each section which is constructed and arranged so that despite the necessary inflexibility of the wall structure, the opposite end portion of a similarly constructed section may be quickly, easily and efficiently manually inserted thereinto and automatically connected thereto in non-releasable positive interlocked relation. This is made possible through the use of an integrally molded enlarged sleeve having hinged latching members extending inwardly from the wall of the sleeve and constructed and arranged to be cammed radially outwardly by the pipe section being inserted to permit entrance thereof, and thereafter snapping inwardly into interlocking relation by extending into a valley between the corrugations of the male portion of the other section of pipe. Thereafter, the two pipe sections cannot be separated by pulling upon them in opposite axial directions, except as a result of a separate intervening act which will withdraw the latching members from the valley into which they extend. Moreover, the latching elements are readily accessible after connection, so that the pipe sections may be separated again by lifting the latching elements out of the valley as aforementioned, in the event it is necessary to do so.

Although the walls of the pipe are rigid and the latching members extend inwardly a substantial distance, the hinged support thereof permits them to be cammed outwardly sufficiently to permit the male portion of a similar pipe to move axially inwardly past the latching members. Once the rib of the male section passes beyond the latching members, the latter automatically snap inwardly into the adjacent valley to effect a positive interlocking relation which acts positively to prevent disconnection of the pipe sections.

The connector is supported on the remainder of the pipe by a frusto-conically annular collar which engages and directs the male end of the entering section of pipe, so that proper alignment of the adjacent pipe section is realized.

BRIEF DESCRIPTION OF THE DRAWINGS

A detailed description of one preferred embodiment of the LARGE DIAMETER CORRUGATED PLASTIC PIPE and method of making same is hereinafter described with specific reference being made to the drawings in which.

DETAILED DESCRIPTION OF THE INVENTION

As set forth hereinabove, in recent years a definite need has arisen for corrugated plastic pipe which are eight (8") inches or larger in diameter. In order to have the required strength to meet industry standards, the wall structure of such pipe must be sufficiently thick so that they are inflexible, rigid but elastic. When an 8" diameter plastic pipe is so constructed, it is estimated that approximately 50–80 lbs. of thrust is required in order to cause plastic pipe having fixed latching members to be joined; the thrust to couple larger pipe (larger than 8") with a fixed latching member is much greater, with the required thrust to couple the pipe sections increasing proportionally with the square of the pipe diameter (that is, increasing proportionally to $D^2$). Such a requirement is prohibitive. When plastic pipe, such as is shown in the Maroschak Pat. No. 3,899,198, is constructed with a wall structure sufficiently thick to meet industry standards for an 8" or larger pipe, it is impossible for the workers in the field to manually join two pieces of pipe of such construction. This is occasioned because, when the wall structure is made sufficiently thick to provide the required strength, it is no longer sufficiently flexible to permit such a joinder by means of practical manual effort. Moreover, if such pipe were to be manufactured with sufficient clearance to permit the joinder of such pieces of pipe, then they would be readily releasable as described in the Maroschak patent and would be undesirable for most purposes.

Furthermore, with respect to some designs of conventional corrugated plastic pipe, the required strength to couple adjacent pipe sections together may cause an "accordian effect," when fixed-tab-type locks are used, as shown in the Maroschak patent. In this situation, the pipe sections are compressed axially due to the compressive coupling forces, thereby causing further difficulties in connecting adjacent pipe sections and possibly causing the fixed-tab-type locks to seat improperly within the corrugations of the adjacent pipe section. This accordian effect is most notable in pipe where deeper corrugations are used to obtain parallel-plate strength at minimum pipe weight. By reducing the required coupling force, the accordian effect could be minimized, thereby reducing pipe weight requirements.

The pipe which is shown hereinabove in the drawings, and as will be described hereinafter, is specifically designed to provide such pipe which are not readily releasable when connected, and which have latch members that are readily accessible from the exterior so as to permit separation as a result of a separate overt act, in the relatively rare event such separation is required. Moreover, the latch members of the pipe shown and described herein are specifically designed to pivot about a fulcrum so as to require less coupling force when connected with other pipe sections, thereby effectively minimizing any accordian effect associated with coupling adjacent pipe sections together.

The plastic pipe shown in FIGS. 1-10, inclusive, are preferably molded out of either high density polyethylene, PVC or polypropylene. When high density polyethylene is utilized, it is preferable to utilize a material having a specific gravity of 0.955±0.005. The pipes shown in FIGS. 1-10, inclusive, are specifically designed to be 8" in diameter or greater although, of course, they can be manufactured at smaller diameters if desired. It is imperative, however, that irrespective of the material from which these pipes are manufactured, that their walls be rigid and inflexible but elastic, so as to have the strength required by the industry.

As shown, the pipe of FIGS. 1-10, inclusive, can be manufactured continuously by molding the same integrally. By utilizing a few carefully selected cuts after molding, such a continuous pipe can be readily cut into sections in which one end portion functions as a female connector and the other end portion functions as a male portion.

Figure 1:
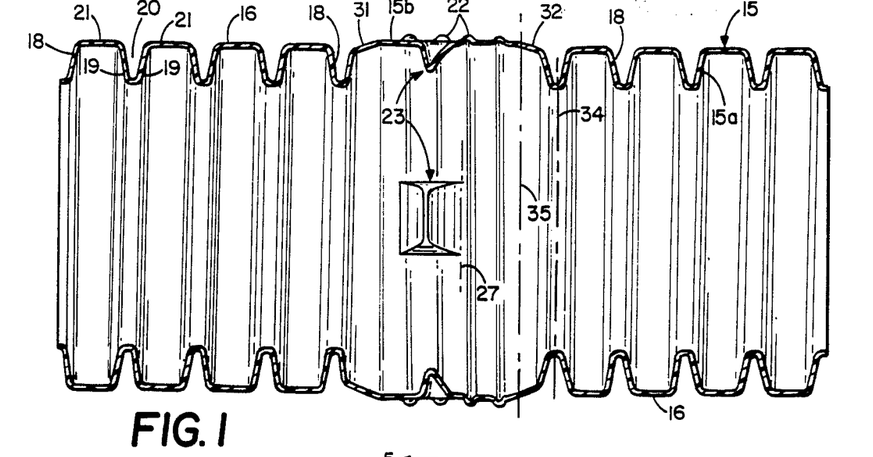
FIG. 1 is a longitudinal vertical sectional view of a section of molded corrugated plastic pipe of large diameter, preparatory to cutting of same, as shown, to produce a section of such pipe with a female connector at one end thereof.
Figure 2:
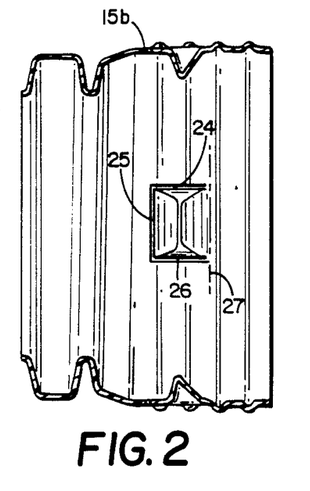
FIG. 2 is a longitudinal vertical sectional view of primarily the coupling section of a molded corrugated plastic pipe of large diameter after making the cut through its corrugated wall structure around its latching elements.
Figure 3:
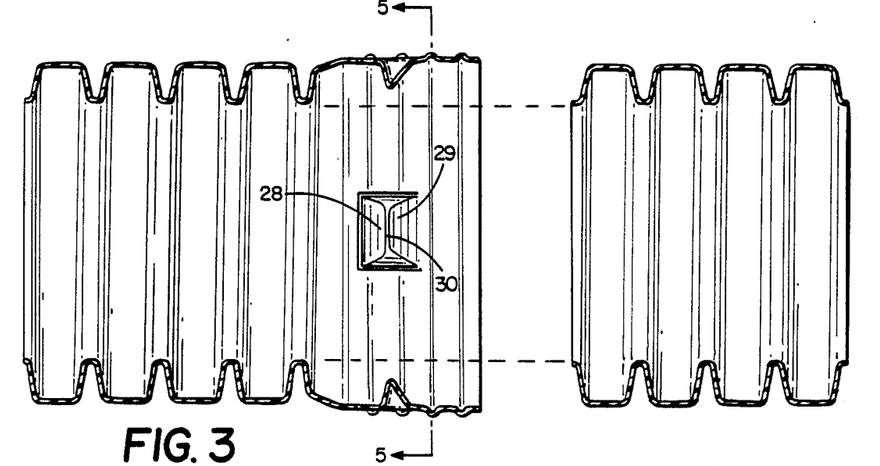
FIG. 3 is a longitudinal vertical sectional view of the section shown in FIG. 1 after the necessary cut or cuts have been made to form two sections of pipe, one with a female connector at one of its ends, and the other with a male end adapted to be inserted into such a female connector, as shown at the right of FIG. 3.

To meet the needs of the industry, the wall structure of the pipe is corrugated and molded of a thermal material, preferably high density polyethylene. Thus, as shown in FIG. 1, a continuous piece of corrugated pipe 15 may be molded by using the equipment, such as is described in the Dickhut et al Pat. No. 4,439,130. As shown, the major portion of such pipe has a wall structure 16 which is corrugated. The thickness of the wall structure 16, as previously indicated, is sufficient to be inflexible, rigid but elastic and preferably has a thickness of 0.050" or more.

The wall structure 16 is characterized, in general, by a plurality of corrugations 18, each of which has valley-defining portions 19 which define the valleys 20 therebetween. Each corrugation or rib 18 has a crown 21, which, for pipes having a diameter of 8" or more, are preferably at least 11/16" wide. These crowns 21 may, of course, have a greater width for pipes of diameter greater than 8" and may be flat-topped as shown or may be of some other configuration such as ridged or grooved.

The pipe 15 as molded is generally characterized by a plurality of elongated sections 15a which may be identified as male sections, and which are connected by relatively short female connector sections 15b, the latter being of slightly greater internal radius than the radius of the corrugations 18 so that the male sections 15a may be received therewithin after the proper cuts have been made. It will be seen that the female section 15b is essentially a sleeve constructed and arranged to receive the corrugated male sections 15a therewithin, and to be locked thereto as hereinafter described. This sleeve element 15b may or may not have, as shown in FIGS. 1-4, inclusive, a plurality of relatively small annular corrugations 22 for strengthening purposes.

Each of the female connector sections 15b is provided with preferably two to six equally circumferentially spaced latch members 23, each disposed in the same transverse plane. Each of these latch members is molded integrally with the pipe 15 and is thereafter cut free along each of its sides and at one of its ends, as at 24, 25 and 26 so that it becomes a lever which is free to swing about its axis of pivot or fulcrum, indicated by the broken line 27 (see FIG. 2). This permits the latching member to swing inwardly or outwardly, as the case may be, about the axis of line 27 for latching and delatching purposes.

Figure 4:
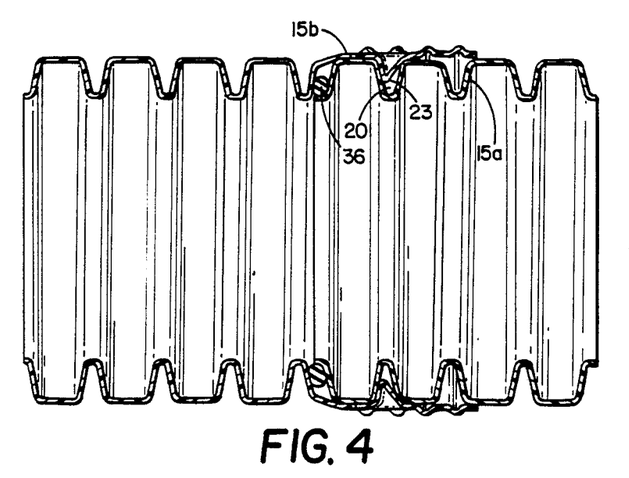
FIG. 4 is a longitudinal vertical sectional view of a section of plastic pipe having a female connector as shown in FIG. 3, with the male end of a similar pipe received within the female connector to effectively and automatically couple the same.
Figure 5:
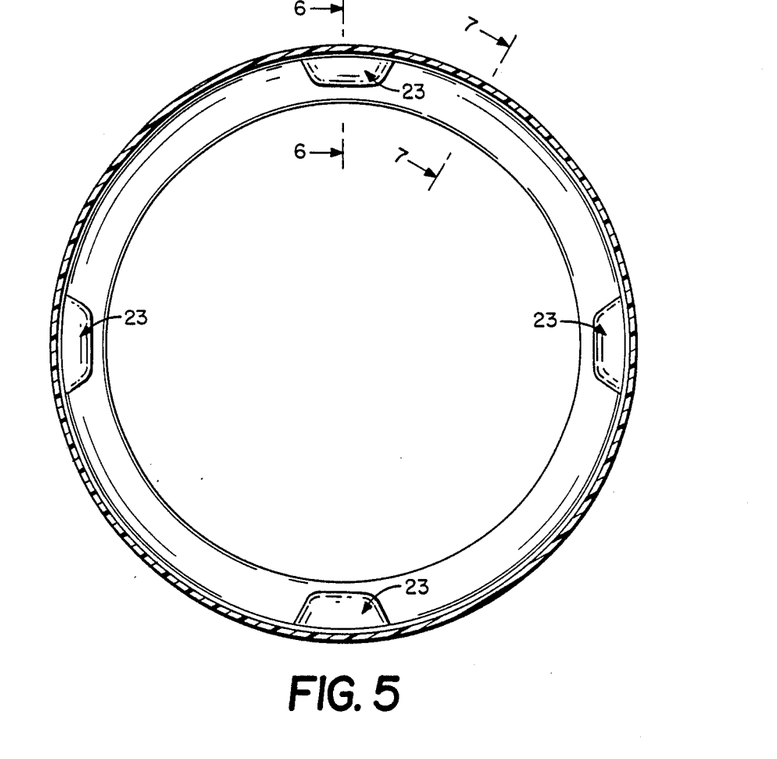
FIG. 5 is a cross-sectional view of the connector end portion of the section of pipe shown in FIG. 3 as viewed from line 5—5 of FIG. 3.

Each of the latch members extends radially inwardly toward the axis of the pipe 15 and is characterized by a substantially vertically extending latching surface 28 and a camming surface 29 which meet along a transverse line 30. Side walls extend between these surfaces to support same, as shown. The camming surface 29 extends at an angle of approximately 25° or greater to the axis of the pipe 15, whereas the latching surface 28 approaches a more vertical relationship to that axis. This can best be seen in FIG. 4 and FIG. 9. The latch member extends radially inwardly a distance of at least 25% of the depth of one of the valleys 20 and preferably more, so as to provide a strong latching surface which increases in latching ability in response to any effort to separate two such sections when joined together, as shown in FIG. 4.

As best shown in FIG. 1, the female connector section 15b is supported at each of its ends by one of a pair of frusto-conically shaped collars 31, 32. The larger end of each of the collars supports the sleeve while the smaller end is connected to the end of one of the valley-defining portions of the adjacent male section 15a. As will be described hereinafter, the collar 32 or some portion thereof is subsequently cut free and discarded, whereas the collar 31 is permitted to remain intact to support the sleeve and its latching members 23. This collar 31 has a definite additional function as hereinafter described.

In order to provide a plurality of pipe sections each having a relatively long male section 15a at one of its ends and a relatively short female connector section 15b at its other end, we make one or more transverse cuts through the exterior wall structure 16 at broken lines 34 and 35, the effect of which is to remove a portion of the collar 32 extending approximately from the broken line 34 through the bottom of the valley adjacent the opposite end of the connector section 15b, to the broken line 35, this latter cut being essentially through the transverse plane which passes through the larger end of the collar 32. When this cut or cuts have been completed, the result will be that the portion of the tubing shown to the left of the cuts in FIG. 1 will remain as a section of pipe with an elongated male portion 15a at its left end and a shorter female portion 15b at its right end. Similarly, the section shown at the right hand of FIG. 1 will constitute a male portion 15a which will have a female connector section 15b (not shown) carried by its end at the right hand side of the view. As a result of the cuts described hereinabove, it will be seen that the wall structure of the male section created by the cuts at the right hand side of FIG. 1 terminates at approximately the bottom of the last valley 20 of that section.

Figure 8:
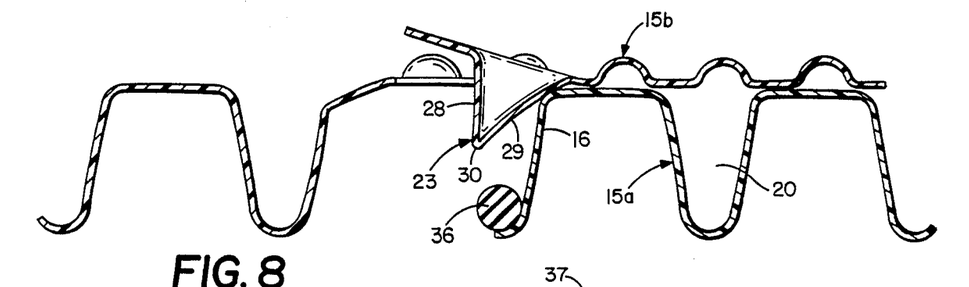
FIG. 8 is a longitudinal vertical sectional view illustrating the camming action which takes place upon the latching element of a connector portion of such a pipe when a male section of similar pipe is inserted thereinto.

Preparatory to joining the male section 15a with the female connector 15b, an optional gasket 36 which may be of approximate circular cross-sectional configuration, may be applied to the end of the male section 15a, as best shown in FIG. 8. When the male section 15a is inserted to the position shown in FIG. 4 and FIG. 9, the latch member 23 will extend into the valley 20 adjacent the end of the section 15a and the optional gasket 36 will perfect the seal between the end corrugation shape of the 15a section and the valley-defining portions which support the female connector portion 15b.

It will be seen by reference to FIG. 4 that when the male section 15a and female connector 15b are so connected, a latch member 23 extends into the valley 20 to an extent at least equal and preferably greater than 25% of the depth of the valley. It is preferable that the latch member extend into the valley at least 50% of its depth, as shown.

It will also be seen that the base or axis of pivot 27 of latch member 23 is disposed axially outwardly of the bottom of the valley supporting the collar 31 a distance at least substantially equal to 1.50 times the axial distance between any two adjacent valley portions 20 of the section 15a. It will also be seen that the base of each latch member 23 is located on the sleeve a distance from the pitch line of the valley adjacent to that latch member a distance substantially equal to 1.50 times the axial distance between the pitch lines of a pair of such valleys.

Figure 6:
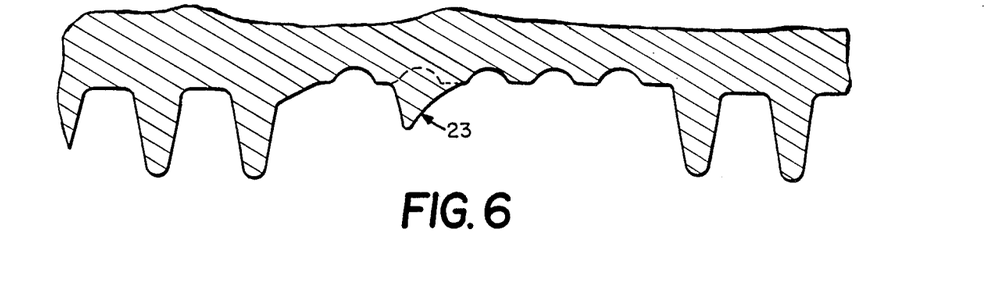
FIG. 6 is a longitudinal vertical sectional view of the portion of the mold which forms the connector portion of the corrugated pipe, taken through the latch element portion, as shown at line 6—6 of FIG. 5.

FIG. 6 is a vertical sectional view of the mold used to form the wall structure which becomes the connector portion 15b, taken through one of the latch members 23.

Figure 7:
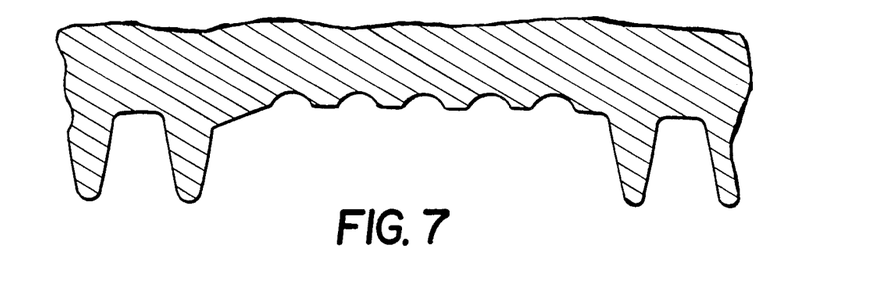
FIG. 7 is a longitudinal vertical sectional view of the same portion of the mold which forms the connector portion of the pipe, taken longitudinally along a line parallel to and circumferentially spaced from that as shown in FIG. 6, and reflecting the construction of the pipe as seen along line 7—7 of FIG. 5.

FIG. 7 is a vertical sectional view through the same mold that is shown in FIG. 6, but taken between any pair of latch members 23.

Figure 9:
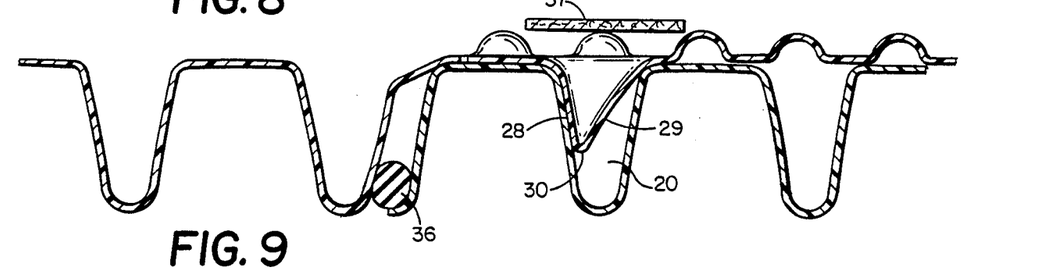
FIG. 9 is a longitudinal sectional view of the two pipe sections shown in FIG. 8 after the camming action has been completed and the latch element has snapped into locking position within the adjacent valley of the male section, the base corrugation profile in the female end restraining the optional seal with the completed joint.

FIGS. 8 and 9 illustrate on a larger scale the camming action which takes place during the joinder of a male section 15a with a female connector section 15b. FIG. 8 shows the male section 15a being thrust inwardly into the female section 15b so that the latch element 23 is being cammed radially outwardly by engagement of its camming surface 29 with a rib 18. It will be seen that the latching member is being forced radially outwardly to permit the crown of the male section 15a to pass therewithin until the following valley 20 is disposed directly inwardly of the latch member 23, at which point the latch member will snap into the valley 20 in latching relation, as shown in FIG. 9. It will be seen that the latching surface 28 extends more vertically and bears against the valley-defining portion which defines the valley 20. If desired, it is possible to insure retention of the latch members within the valley, irrespective of the magnitude of separation forces applied thereto, by securing a belt or strapping 37 around the latch members, as shown in FIG. 9.

Figure 10:
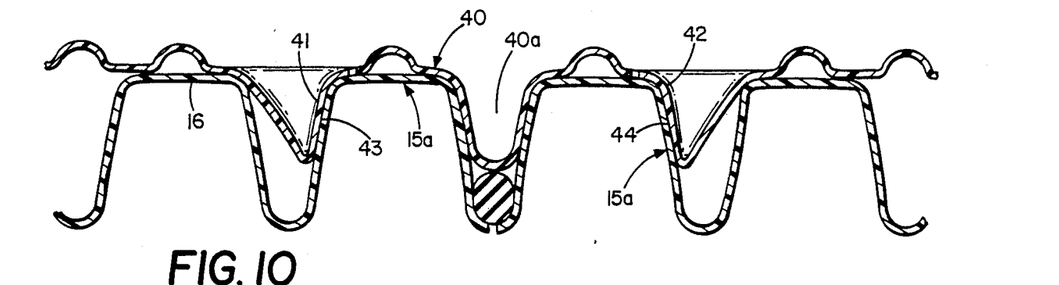
FIG. 10 is a longitudinal vertical sectional view of a section of plastic pipe constituting a coupling having a connector at each of its ends and adapted to receive and couple thereto a male section of pipe in each of its end.

FIG. 10 shows an alternative form of pipe which can be molded so as to provide a female connector capable of receiving at each of its opposite ends (instead of one) a male section 15a. As shown, such a female connector indicated by the numeral 40, will have a pair of oppositely facing latch elements 41 and 42 separated by one or more valleys 40a. Each of the latch members 41 and 42 are constructed identically to the latch members 23, except that they are arranged so that their latching surfaces 43 and 44 face each other. They can be molded in the same manner as the previously described pipe, as will be readily understood. It will be noted that they are spaced from each other an approximate distance of two or more valleys in such a way that they will engage in the end valley of each of the male sections 15a, and the gasket 36 is restrained between the male sections 15a. Such a connector element may have some utility when it is desired to connect and or seal a pair of male sections 15a, as shown in that figure.

Figure 11:
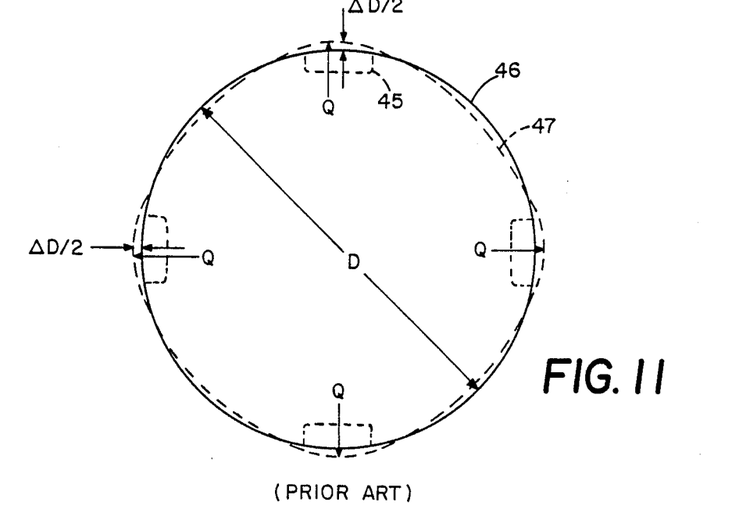
FIG. 11 is an end elevational view of the prior art illustrating how a pipe as heretofore formed must deform to accommodate another pipe section having fixed locking tabs, in order to accomplish a connection therebetween.

FIG. 11 has been included merely to illustrate the prior art and the manner in which a piece of plastic pipe must be distorted when a fixed, rather than a pivotable, latch member is utilized. The latch members have been indicated by the numeral 45 and the wall of the pipe by the numeral 46. The broken line 47 indicates the shape assumed by the wall structure of the pipe and shows the extent to which the radial wall structure of the pipe 46 must be deformed in order to effect a connection between two pieces of such pipe, one of which has fixed latch members, such as indicated by the numeral 45.

Wherever herein the phrase "rigid, inflexible but elastic" or its substantial equivalent is utilized, it is intended to connote that the wall structure of the plastic pipe is sufficiently rigid and inflexible so that, as a minimum, it would be impossible to manually telescope two pieces of such corrugated pipe, if one of them has fixed latch members intended to effect a latched connection therebetween. It also connotes that the wall structure of the plastic pipe is of sufficient thickness and rigidity to meet industry standard requirements for 8" or larger diameter pipe.

Wherever herein the term "large diameter" is utilized in reference to plastic pipe, it is intended to connote plastic pipe having an internal diameter of 8 inches, or greater.

When a male section 15a is connected to a female connector section 15b, as shown in FIG. 4, an effective and highly improved connection is obtained. As the male section 15a is inserted into the connector 15b, the frusto-conical collar 31 is engaged by the end of section 15a and aligns and guides the same into correct position for proper engagement.

The latch member 23 provides a highly effective and efficient latching function which increases in its locking capability as any attempt is made to separate the two sections after the connection has been made. Of equal importance is the fact that the connection is obtained easily and automatically by merely thrusting the male section 15a into the female section 15b and the connection can be accomplished without undue stress on the part of the user. Moreover, the connection is normally nonreleasable, in contrast to plastic pipe which have heretofore been manufactured with fixed latch members designed to be readily released. In addition, if it becomes desirable to disconnect two such sections for any reason whatever, this can be accomplished by merely lifting each of the latch members 23 radially outward, whereupon the two pipe sections can be readily disconnected.

It will, of course, be understood that various changes may be made in the form, details, arrangement and proportions of the parts without departing from the scope of the invention which consists of the matter shown and described herein and set forth in the appended claims.

What is claimed is:

1. Large-diameter corrugated plastic pipe having inherent non-releasable coupling means readily accessible from the exterior when coupled to other pipe, said pipe
   (a) a pipe having a generally cylindrical corrugated wall structure with spaced apart successive annular ribs with annular valley defining portions therebetween;
   (b) said wall structure being formed of either high density polyethylene, PVC or polypropylene and being sufficiently thick so as to be relatively inflexible, rigid but elastic throughout and extending from adjacent one end portion of the pipe and throughout the remainder of the pipe;

(c) said end portion comprising
  (1) a generally cylindrical relatively inflexible, rigid but elastic through-out sleeve element integrally formed with said wall structure and of the same material and having an inner diameter exceeding only slightly the outer diameter of said ribs;
  (2) a support collar having a smaller and a larger end and supporting said sleeve element upon the end of said wall structure of the remainder of the pipe and extending therebetween and being integrally formed therewith and having the smaller end thereof connected to said wall structure in supported relation and the larger end thereof connected to said sleeve element in supporting relation;
  (3) a plurality of circumferentially spaced latching members located intermediate the ends of said sleeve element and integrally formed therewith of the same material and each extending inwardly therefrom around its interior in the same transverse plane relative thereto, the radial distance from the inner end of said latching members to the axis of said sleeve element being less than the radius of said ribs;
  (4) each of said latching members being comprised of a lever member supported at one of its ends at its fulcrum by said sleeve element and formed integrally therewith of the same material and extending in the plane thereof from its fulcrum toward the remainder of the pipe and being free at its other end and along each of its sides to permit same to pivot at its fulcrum along a circumferential line of said sleeve element;
  (5) each of said lever members carrying a latch element which extends inwardly therefrom and has a latching surface adjacent the free end of its associated lever member extending radially of said sleeve element and facing toward the remainder of the pipe;
  (6) said latching elements being constructed, arranged and located on said sleeve element so that the latching surfaces thereof extend into and engage in latching relation valley-defining portions of a similarly constructed pipe when the end of the remainder portion of such a pipe is thrust into the outer end of said sleeve element;
  (7) each of said lever members also having a camming surface located outwardly of said latching surface and extending radially inwardly relative to said sleeve element from a point adjacent the fulcrum of said lever member to a point adjacent its said latching surface; and
  (8) each of said latching elements extending radially inwardly from its supporting lever member a distance at least equal to 25% of the depth of the valley-defining portions of said pipe.

2. Large-diameter corrugated plastic pipe having inherent non-releasable coupling means readily accessible from the exterior when coupled to other pipe, said pipe comprising:
  (a) a pipe having a generally cylindrical corrugated, relatively inflexible, rigid but elastic wall structure with spaced apart successive annular ribs with annular valley defining portions therebetween;
  (b) said wall structure being rigid but elastic throughout and formed of high density polyethylene and extending from adjacent one end portion of the pipe and throughout the remainder of the pipe;
  (c) said end portion comprising:
    (1) a generally cylindrical, inflexible, rigid but elastic sleeve element integrally formed with said wall structure and having an inner diameter exceeding only slightly the outer diameter of said ribs;
    (2) a support collar supporting said sleeve element upon the end of said wall structure of the remainder of the pipe and extending therebetween and being integrally formed therewith and having a smaller end thereof connected to said wall structure in supported relation and a larger end thereof connected to said sleeve element in supporting relation; and
    (3) a plurality of spaced latching members located intermediate the ends of said sleeve element and integrally formed therewith and each extending inwardly therefrom around its interior in the same transverse plane relative thereto, the radial distance from the inner end of said latching members to the axis of said sleeve element being less than the radius of said ribs;
    (4) each of said latching members being comprised of a lever member supported at its fulcrum by said sleeve element and formed integrally therewith and extending in the plane thereof from its fulcrum toward the remainder of the pipe and being free at its tip and along each of its sides to permit same to flex at its fulcrum along a circumferential line of said sleeve element;
    (5) each of said lever members carrying a latch element which extends inwardly therefrom and has a latching surface adjacent the tip of its associated lever member extending radially of said sleeve element and facing toward the remainder of the pipe;
    (6) said latching elements being constructed, arranged and located on said sleeve element so that the latching surfaces thereof extend into and engage in latching relation valley-defining portions of a similarly constructed pipe when the end of the remainder portion of such a pipe is thrust into the outer end of said sleeve element;
    (7) each of said lever members also having a camming surface located outwardly of said latching surface and extending radially inwardly relative to said sleeve element from a point adjacent the fulcrum of said lever member to its said latching surface; and
    (8) said corrugated wall structure having a thickness of at least 0.050 inch.

3. Large-diameter corrugated plastic pipe having inherent non-releasable coupling means readily accessible from the exterior when coupled to other pipe, said pipe comprising:
  (a) a pipe having a generally cylindrical corrugated rigid but elastic wall structure with spaced apart successive annular ribs with annular valley portions therebetween;
  (b) said wall structure being rigid and elastic throughout and integrally formed preferably of high density polyethylene and extending from adjacent one end portion of the pipe and throughout the remainder of the pipe;
  (c) said end portion comprising:

(1) a generally cylindrical, inflexible, rigid but elastic sleeve element integrally formed with said wall structure and having an inner diameter exceeding only slightly the outer diameter of said ribs;

(2) a support collar supporting said sleeve element upon the end of said wall structure of the remainder of the pipe and extending therebetween and being integrally formed therewith and having a smaller end thereof connected to said wall structure in supported relation and a larger end thereof connected to said sleeve element in supporting relation;

(3) a plurality of spaced latching members located intermediate the ends of said sleeve element and integrally formed therewith and each extending inwardly therefrom around its interior in the same transverse plane relative thereto, the radial distance from the inner end of said latching members to the axis of said sleeve element being less than the radius of said ribs;

(4) each of said latching members being comprised of a lever member supported at its fulcrum by said sleeve element and formed integrally therewith and extending in the plane thereof from its fulcrum toward the remainder of the pipe and being free at its tip and along each of its sides to permit same to flex at its fulcrum along a circumferential line of said sleeve element;

(5) each of said lever members carrying a latch element which extends inwardly therefrom and has a latching surface adjacent the tip of its associated lever member extending radially of said sleeve element and facing toward the remainder of the pipe;

(6) said latching elements being constructed, arranged and located on said sleeve element so that the latching surfaces thereof extend into and engage in latching relation valley-defining portions of a similarly constructed pipe when the end of the remainder portion of such a pipe is thrust into the outer end of said sleeve element;

(7) each of said lever members also having a camming surface located outwardly of said latching surface and extending radially inwardly relative to said sleeve element from a point adjacent the fulcrum of said lever member to its said latching surface; and (8) said annular ribs each having a crown with an axial dimension of at least 11/16 inches.

4. The structure defined in claim 1 wherein said corrugated wall structure has a thickness of at least 0.050 inch.

5. The structure defined in claim 1 wherein said corrugated wall structure has a thickness of at least 0.050 inch and the high density polyethylene from which it is made has a specific gravity of approximately 0.955.

6. The structure defined in claim 1 wherein said annular ribs have an axial dimension of at least 11/16 inch.

7. The structure defined in claim 1 wherein said corrugated wall structure has a thickness of at least 0.050 inch and said annular ribs have an axial dimension of at least 11/16 inch.

8. Large-diameter corrugated plastic pipe having inherent non-releasable coupling means readily accessible from the exterior when coupled to other pipe, said pipe comprising:

(a) a pipe having a generally cylindrical corrugated, relatively inflexible, rigid but elastic wall structure with spaced apart successive annular ribs with annular valley portions therebetween;

(b) said wall structure being rigid but elastic and integrally formed of high density polyethylene extending from adjacent one end portion of the pipe and throughout the remainder of the pipe;

(c) said end portion comprising:

(1) a generally cylindrical rigid but elastic sleeve element integrally formed with said wall structure and having an inner diameter exceeding only slightly the outer diameter of said ribs;

(2) a substantially frusto-conically shaped support collar supporting said sleeve element upon the end of said wall structure of the remainder of the pipe and extending therebetween and being integrally formed therewith and having the smaller end thereof connected to said wall structure in supported relation and the larger end thereof connected to said sleeve element in supporting relation;

(3) a plurality of spaced latching members located intermediate the ends of said sleeve element and integrally formed therewith and each extending inwardly therefrom around its interior in the same transverse plane relative thereto, the radial distance from the inner end of said latching members to the axis of said sleeve element being less than the radius of said ribs;

(4) each of said latching members being comprised of a lever member supported at its fulcrum by said sleeve element and formed integrally therewith and extending in the plane thereof from its fulcrum toward the remainder of the pipe and being free at its tip and along each of its sides to permit same to flex at its fulcrum along a circumferential line of said sleeve element;

(5) each of said lever elements carrying a latch element which extends inwardly therefrom and has a latching surface adjacent the tip of its associated lever member extending radially of said sleeve element and facing toward the remainder of the pipe;

(6) each of said latching members having a latching surface and being constructed, arranged and located on said sleeve element so that the latching surfaces thereof extend into and engage in latching relation valley-defining portions of a similarly constructed pipe when the end of the remainder portion of such a pipe is thrust into the outer end of said sleeve element; and (7) each of said lever members also having a camming surface located outwardly of said latching surface and extending radially inwardly relative to said sleeve element from a point adjacent the fulcrum of said lever member to its said latching surface.

9. The structure defined in claim 8, wherein said wall structure at the opposite end portion of the pipe terminates at the bottom of one of its said valley portions.

10. The structure defined in claim 8 wherein said latching members are located on said sleeve element so that the said latching surface of each is disposed so as to extend into, engage and latch a valley-defining wall portion of an opposite end portion of a similarly formed drainage pipe when the latter is inserted into said sleeve element and into abutting relation with said collar.

11. The structure defined in claim 8 wherein said latching members are located on said sleeve element so that the said latching surface of each is disposed outwardly of the bottom of the adjacent valley portion of said remainder of said pipe a distance substantially equal to 1.50 times the axial distance between two adjacent valley portions of said wall structure.

12. The structure defined in claim 8 wherein said latching members are located on said sleeve element so that the said latching surfaces of each is disposed outwardly of the bottom of the adjacent valley portion of said remainder of said pipe a distance at least equal to 1.50 times the axial distance between two adjacent valley portions of said wall structure.

13. The structure defined in claim 8 wherein said wall structure of the opposite end portion of the pipe terminates at the bottom of one of the said valley portions of said wall structure; and
   (d) a second and similarly formed pipe having its said opposite end portion inserted into said sleeve element with the end thereof abutting said collar.

14. The structure defined in claim 8 wherein the base of said latching members are located on said sleeve elements so that the latching surface of each is located a distance from the pitch line of the valley adjacent said latching members substantially equal to 1.50 times the axial distance between the pitch lines of a pair of such valley portions adjacent to each other.

15. The structure defined in claim 8 wherein said collar is integrally formed with and supported by said wall structure of a valley-defining portion of the remainder of the pipe.

16. The structure defined in claim 8 wherein said collar is supported by the terminal portion of said wall structure of a valley-defining portion of the remainder of the pipe.

17. Large-diameter corrugated plastic pipe having inherent non-releasable coupling means readily accessible from the exterior when coupled to other pipe, said pipe comprising:
   (a) a pipe having a generally cylindrical corrugated, relatively inflexible, rigid but elastic wall structure with spaced apart successive annular ribs with annular valley portions therebetween;
   (b) said wall structure being inflexible and being rigid but elastic throughout and formed of high density polyethylene and extending from adjacent one end portion of the pipe and throughout the remainder of the pipe;
   (c) said end portion comprising:
      (1) a cylindrical rigid, inflexible, but elastic sleeve element integrally formed with said wall structure and having an inner diameter exceeding only slightly the outer diameter of said ribs;
      (2) a support collar connected to the end of said wall structure of the remainder of the pipe in supported relation and supporting said sleeve element thereupon in coaxial relation and extending therebetween and being integrally formed therewith; and
      (3) a plurality of spaced latching members intermediate the ends of said sleeve element and integrally formed therewith and each extending inwardly therefrom around its interior in the same transverse plane relative thereto, the radial distance from the inner end of said latching members to the axis of said sleeve element being less than the radius of said ribs;
      (4) each of said latching members being comprised of a rigid but elastic lever member supported at its fulcrum by said sleeve element and formed integrally therewith and extending in the plane thereof from its fulcrum toward the remainder of the pipe and being free at its tip and along each of its sides to permit same to flex at its fulcrum along a circumferential line of said sleeve element;
      (5) each of said lever members carrying a latch element which extends inwardly therefrom and has a latching surface adjacent the tip of its associated lever member extending radially of said sleeve element and facing toward the remainder of the pipe;
      (6) each of said lever members also having a camming surface located outwardly of said latching surface and extending radially inwardly relative to said sleeve element from a point adjacent the fulcrum of said lever member to its said latching surface;
      (7) said latching elements being constructed, arranged and located on said sleeve element so that the latching surfaces thereof extend into and engage in latching relation valley-defining portions of a similarly constructed pipe when the end of the remainder portion of such a pipe is thrust into the outer end of said sleeve element.

18. The structure defined in claim 17 wherein said collar extends in its entirety radially outwardly of its point of connection with its said supporting wall structure.

19. The structure defined in claim 17 wherein said latch members are located on said sleeve elements so that the latching surface of each is located a distance from the pitch line of the valley adjacent said latching members substantially 1.50 times the axial distance between the pitch lines of a pair of such valley portions adjacent to each other.

20. A pipe coupling for large-diameter corrugated plastic pipe having inherently non-releasable coupling means readily accessible from the exterior when coupled to end sections of such pipe, comprising:
   (a) a pipe having wall structure formed of a member of a group made up of high density polyethylene, PVC, and polypropylene and being sufficiently thick so as to be inflexible, rigid but elastic throughout;
   (b) said pipe having opposite end portions and an intermediate portion;
   (c) the wall structure of said end portions having an internal diameter only slightly larger than the external diameter of the corrugated pipe to be coupled thereby;
   (d) said intermediate portion of said pipe being comprised of a single inwardly extending corrugation having an internal diameter substantially less than the external diameter of the corrugated pipe to be coupled thereby;
   (e) a pair of frusto-conically shaped collars carried by said intermediate portion at the outer ends of said single corrugation and one each of which supports one of said end portions of said pipe;
   (f) the smaller end of each of said collars being directly connected to and supported by said single corrugation of said intermediate portion;

(g) the larger end of each of said collars being connected directly and in supporting relation to one of said end portions;

(h) a plurality of circumferentially spaced latching members located on each of said end portions outwardly of said single corrugation and integrally formed therewith and each extending inwardly from its supporting end portion around its interior in the same transverse plane relative thereto, the diametrical distance between the radially inner ends of said latching members being substantially less than the outer diameter of the corrugated pipe to be coupled thereby;

(i) each of said latching members being comprised of a lever member supported at one of its ends at its fulcrum by said end portion and formed integrally therewith of the same material and extending in the plane thereof from the fulcrum toward said intermediate portion and being free at its other end and along each of its sides to permit same to pivot at its fulcrum along a circumferential line of said end portion;

(j) each of said lever members carrying a latch element which depends inwardly therefrom and has a latching surface adjacent the free end of its associated lever member extending radially of said end portion and facing toward said intermediate portion;

(k) said latching members being constructed, arranged and located on said end portions so that the latching surfaces thereof will extend into and engage in latching relation valley-defining portions of the corrugated pipe to be coupled thereto when the latter is thrust into one end portion of said pipe; and (1) each of said lever members also having a camming surface located outwardly of its associated latching surface and extending radially inwardly relative to said intermediate portion from a point adjacent the fulcrum of said lever member to a point adjacent its said latching surface, each of said latching members extending radially inwardly from its supporting lever member a distance in excess of 25% of the depth of the corrugation defining portions of said intermediate portion.

21. Large-diameter corrugated plastic pipe having inherent non-releasable coupling means readily accessible from the exterior when coupled to other pipe, said pipe comprising:

(a) a pipe having a generally cylindrical corrugated, relatively inflexible, rigid but elastic wall structure with spaced apart successive annular ribs with annular valley portions therebetween;

(b) said wall structure being inflexible and being rigid but elastic throughout and formed of high density polyethylene and extending from adjacent one end portion of the pipe and throughout the remainder of the pipe;

(c) said end portion comprising:

(1) a cylindrical rigid, inflexible, but elastic sleeve element integrally formed with said wall structure and having an inner diameter exceeding only slightly the outer diameter of said ribs;

(2) a support collar connected to the end of said wall structure of the remainder of the pipe in supported relation and supporting said sleeve element thereupon in coaxial relation and extending therebetween and being integrally formed therewith; and (3) a plurality of spaced latching members intermediate the ends of said sleeve element and integrally formed therewith and each extending inwardly therefrom around its interior in the same transverse plane relative thereto, the radial distance from the inner end of said latching members to the axis of said sleeve element being less than the radius of said ribs;

(4) each of said latching members being comprised of a rigid but elastic lever member supported at its fulcrum by said sleeve element and formed integrally therewith and extending in the plane thereof from its fulcrum toward the remainder of the pipe and being free at its tip and along each of its sides to permit same to flex at its fulcrum along a circumferential line of said sleeve element;

(5) each of said lever members carrying a latch element which extends inwardly therefrom to a crest and has a latching surface adjacent the tip of its associated lever member extending radially of said sleeve element and facing toward the remainder of the pipe;

(6) each of said lever members also having a camming surface located outwardly of said latching surface and extending radially inwardly relative to said sleeve element from a point adjacent the fulcrum of said lever member to its said latching surface;

(7) said latching elements being constructed, arranged and located on said sleeve element so that the latching surfaces thereof extend into and engage in latching relation valley-defining portions of a similarly constructed pipe when the end of the remainder portion of such a pipe is thrust into the outer end of said sleeve element;

(8) each said lever member having a readily accessible lip portion disposed radially outward from said crest of said latch element and extending axially therefrom toward the remainder of the pipe a distance equal to at least one-half the axial width of one of said ribs.

22. Large-diameter corrugated plastic pipe having inherent non-releasable coupling means readily accessible from the exterior when coupled to other pipe, said pipe comprising:

(a) a pipe having a generally cylindrical corrugated, relatively inflexible, rigid but elastic wall structure with spaced apart successive annular ribs with annular valley portions therebetween;

(b) said wall structure being inflexible and being rigid but elastic throughout and formed of high density polyethylene and extending from adjacent one end portion of the pipe and throughout the remainder of the pipe;

(c) said end portion comprising:

(1) a cylindrical rigid, inflexible, but elastic sleeve element integrally formed with said wall structure and having an inner diameter exceeding only slightly the outer diameter of said ribs;

(2) a support collar connected to the end of said wall structure of the remainder of the pipe in supported relation and supporting said sleeve element thereupon in coaxial relation and extending therebetween and being integrally formed therewith; and (3) a plurality of spaced latching members intermediate the ends of said sleeve element and integrally formed therewith and each extending inwardly therefrom around its interior in the same transverse plane relative thereto, the radial distance from the inner end of said latching members to the axis of said sleeve element being less than the radius of said ribs;

(4) each of said latching members being comprised of a rigid but elastic lever member supported at its fulcrum by said sleeve element and formed integrally therewith and extending in the plane thereof from its fulcrum toward the remainder of the pipe and being free at its tip and along each of its sides to permit same to flex at its fulcrum along a circumferential line of said sleeve element;

(5) each of said lever members carrying a latch element which extends inwardly therefrom and has a latching surface adjacent the tip of its associated lever member extending radially of said sleeve element and facing toward the remainder of the pipe;

(6) each of said lever members also having a camming surface located outwardly of said latching surface and extending radially inwardly relative to said sleeve element from a point adjacent the fulcrum of said lever member to its said latching surface;

(7) said latching elements being constructed, arranged and located on said sleeve element so that the latching surfaces thereof extend into and engage in latching relation valley-defining portions of a similarly constructed pipe when the end of the remainder portion of such a pipe is thrust into the outer end of said sleeve element;

(8) each said lever member having a readily accessible axially extending lip portion disposed between said latching surface and the tip of said lever member, said lip portion extending at least to the center of one of said ribs of a similarly constructed pipe when the end of the remainder portion of such a pipe is thrust into the outer end of said sleeve element.

23. Large-diameter corrugated plastic pipe having inherent non-releasable coupling means readily accessible from the exterior when coupled to other pipe, said pipe comprising:

(a) a pipe having a generally cylindrical corrugated, relatively inflexible, rigid but elastic wall structure with spaced apart successive annular ribs with annular valley portions therebetween;

(b) said wall structure being inflexible and being rigid but elastic throughout and formed of high density polyethylene and extending from adjacent one end portion of the pipe and throughout the remainder of the pipe;

(c) said end portion comprising:

(1) a cylindrical rigid, inflexible, but elastic sleeve element integrally formed with said wall structure and having an inner diameter exceeding only slightly the outer diameter of said ribs;

(2) a support collar connected to the end of said wall structure of the remainder of the pipe in supported relation and supporting said sleeve element thereupon in coaxial relation and extending therebetween and being integrally formed therewith; and (3) a plurality of spaced latching members intermediate the ends of said sleeve element and integrally formed therewith and each extending inwardly therefrom around its interior in the same transverse plane relative thereto, the radial distance from the inner end of said latching members to the axis of said sleeve element being less than the radius of said ribs;

(4) each of said latching members being comprised of a rigid but elastic lever member supported at its fulcrum by said sleeve element and formed integrally therewith and extending in the plane thereof from its fulcrum toward the remainder of the pipe and being free at its tip and along each of its sides to permit same to flex at its fulcrum along a circumferential line of said sleeve element;

(5) each of said lever members carrying a latch element which extends inwardly therefrom and has a latching surface adjacent the tip of its associated lever member extending radially of said sleeve element and facing toward the remainder of the pipe;

(6) each of said lever members also having a camming surface located outwardly of said latching surface and extending radially inwardly relative to said sleeve element from a point adjacent the fulcrum of said lever member to its said latching surface;

(7) said latching elements being constructed, arranged and located on said sleeve element so that the latching surfaces thereof extend into and engage in latching relation valley-defining portions of a similarly constructed pipe when the end of the remainder portion of such a pipe is thrust into the outer end of said sleeve element;

(8) each said sleeve element having a plurality of axially spaced successive annular ribs disposed on its external surface adjacent said latching members.

* * * * *

UNITED STATES PATENT AND TRADEMARK OFFICE
CERTIFICATE OF CORRECTION

PATENT NO. : 4,969,670
DATED : November 13, 1990
INVENTOR(S) : Eldon G. Bonnema and James L. Fouss It is certified that error appears in the above-identified patent and that said Letters Patent is hereby corrected as shown below:

Column 2, line 53, delete "Out" and substitute therefor --Our--.

Column 7, line 64, after "connect" add --,--.
Col. 8, line 58:
Claim 1, line 4, after "pipe" add --comprising:--.

Signed and Sealed this

Thirteenth Day of October, 1992

Attest:

DOUGLAS B. COMER

Attesting Officer   Acting Commissioner of Patents and Trademarks